United States Patent [19]

Nett

[11] Patent Number: 4,838,602
[45] Date of Patent: * Jun. 13, 1989

[54] PICKUP BED TONNEAU COVER MOUNTING

[76] Inventor: James A. Nett, P.O. Box 825, Norman, Okla. 73072

[*] Notice: The portion of the term of this patent subsequent to Mar. 15, 2005 has been disclaimed.

[21] Appl. No.: 160,186

[22] Filed: Feb. 25, 1988

Related U.S. Application Data

[63] Continuation of Ser. No. 28,357, Mar. 20, 1987, Pat. No. 4,730,866.

[51] Int. Cl.$^4$ .............................................. B60J 7/10
[52] U.S. Cl. ................................................. 296/100
[58] Field of Search ................................. 296/100, 98

[56] References Cited

U.S. PATENT DOCUMENTS

| | | | |
|---|---|---|---|
| 3,936,077 | 2/1976 | Bliek | 296/100 |
| 4,273,377 | 6/1981 | Alexander | 296/100 |
| 4,279,064 | 7/1981 | Simme | 24/248 R |
| 4,607,876 | 8/1986 | Reed | 296/100 |
| 4,639,033 | 1/1987 | Wheatley et al. | 296/100 |
| 4,647,103 | 3/1987 | Walblay | 296/100 |

*Primary Examiner*—Robert R. Song

[57] ABSTRACT

A device for releasably attaching the marginal edges of a flexible cover to the end and sidewalls of a pickup truck bed includes a bar and channel clamp member depending adjacent the pickup bed inner sidewall flange and supporting elongated rails on the upper limit of the respective end and sidewall. The rails being provided with opposing lateral coextensive slots receiving fastening members securing the clamp members and cover thereto in a manner which fulcrums the clamp members against the sidewalls inner surface to assist in maintaining the cover taut.

25 Claims, 2 Drawing Sheets

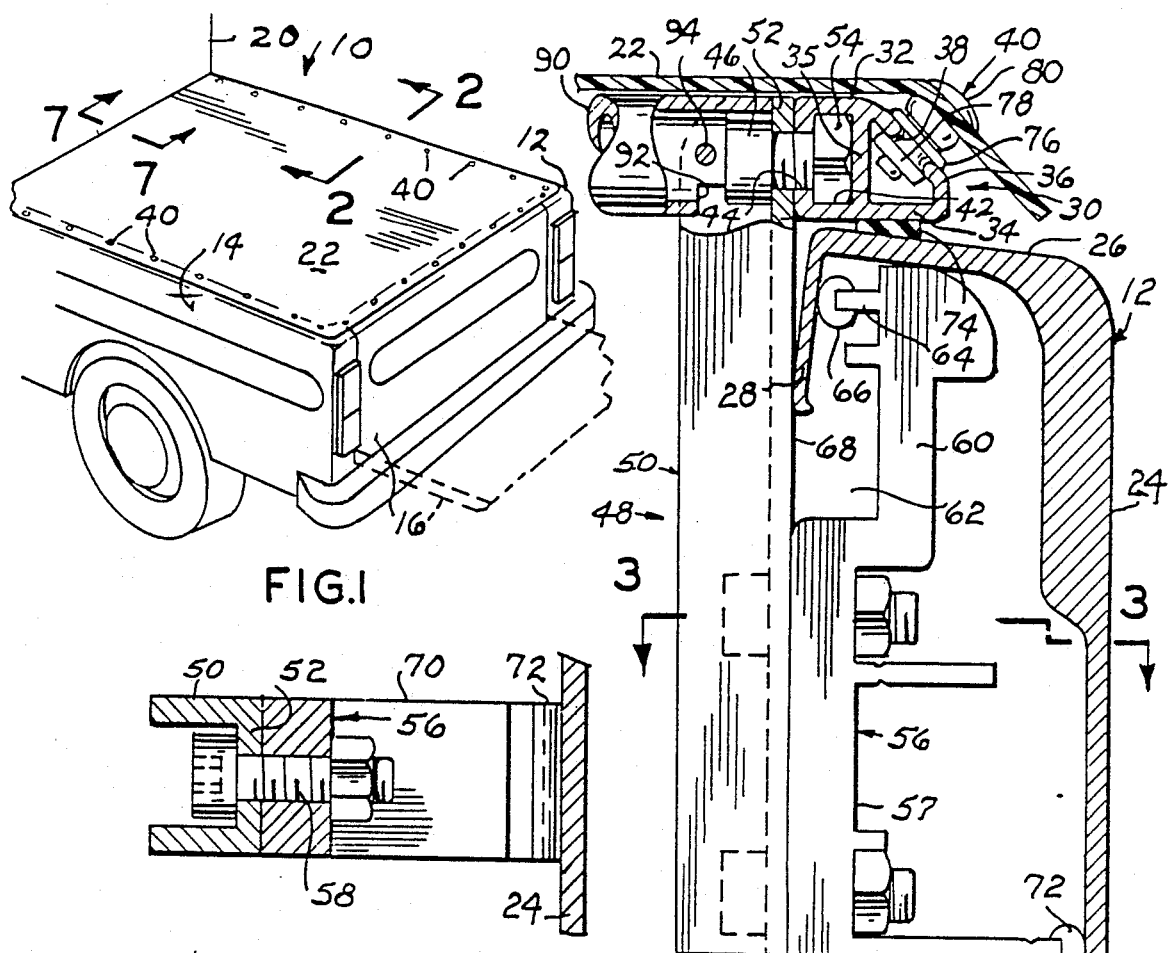
FIG.1
FIG. 3
FIG. 2
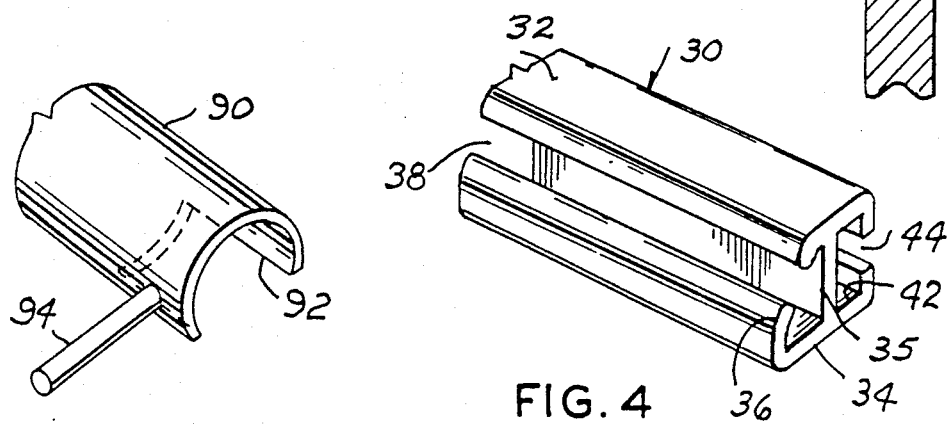
FIG.8
FIG. 4

PICKUP BED TONNEAU COVER MOUNTING

This is a continuation of application Ser. No. 028,357, filed Mar. 20, 1987, now U.S. Pat. No. 4,730,866 issued Mar. 15, 1988.

BACKGROUND OF THE INVENTION

1. Field of the invention

The present invention relates to pickup bed covers and more particularly to a pickup bed sidewall attached mount for securing a tonneau cover rail to the pickup bed.

A tonneau cover is frequently mounted on pickup beds to shield contents therein from view, sunshine or inclement weather. Further, such covers tend to increase the miles per gallon of gasoline burned.

This invention provides a pickup bed sidewall rail member easily fastened by snap fasteners to the perimeter of a tonneau cover.

2. Description of the Prior Art

Heretofor in providing pickup bed sidewalls with fasteners it has been general practice to fasten one section of fasteners to the pickup bed sidewall and end gate by drilling holes therein. This increases the cost of installation and does not accommodate the shrink and/or expanding characteristics of the cover frequently resulting in the cover either being too loose and thereby collecting water or snow in the central portion of the cover.

The most pertinent prior patent is believed to be U.S. Pat. No. 4,639,033 which discloses connecting a right angular rail in overlying relation to the pickup sidewall by a clamp member impinging a portion of the rail to a pickup sidewall flange. A C-shaped hook, coextensive with and secured to the tonneau cover marginal edges, resiliently engages the lateral edge or lip of the cover supporting rail projecting over the pickup sidewalls and tailgate.

This invention is distinctive over this patent by a sidewall member supporting a cover mounting rail on the top of the pickup bed sidewalls and which has end members extending between the sidewall rails adjacent the pickup cab and across the tailgate. The rail support, resiliently engages the pickup bed sidewalls and allows sufficient variation between the sidewall rail mounted position and forward to rearward spacing of the transverse rails to accommodate weather induced variations in the transverse and longitudinal dimensions of the tonneau cover.

SUMMARY OF THE INVENTION

An elongated extruded metallic rail, substantially right triangular in transverse section, defines opposing laterally open slots when coextensively overlying a pickup bed sidewall. The outer or lateral slot opening outwardly with respect to the pickup bed longitudinally slidably receives a plurality of the base portion of snap fasteners which cooperate with companion top portions of the snap fasteners secured in selected spaced relation to the marginal edge portions of a tonneau cover so that the respective marginal edge of the cover is inclined downward and outwardly with respect to the interior of the pickup bed. The opposite or inwardly open rail slot cooperatively receives slidably the nut of a bolt fastener projecting through the top end portion of a clamp channel member depending from the inner side of the rail adjacent the inner depending flange of a pickup sidewall. A clamp bar, secured to the depending end portion of the channel, resiliently grips the pick-up bed sidewall flange and abuts the depending surface of the pickup sidewall horizontal top portion. Identical tonneau cover supporting rails extend between the sidewall rail ends and are removably connected thereto at the forward and rearward limit of the pickup bed.

The principal object of this invention is to provide a tonneau cover fastening rail system for the sidewalls and respective ends of a pickup truck bed which may be easily connected therewith without drilling or modifying the pickup sidewalls or end gate and which compensates for minor variations in the transverse and longitudinal dimensions of a tonneau cover during the several seasons of the year.

BRIEF DESCRIPTION OF THE DRAWINGS

FIG. 1 is a fragmentary perspective view of the pickup truck bed with the apparatus supporting a tonneau cover;

FIG. 2 is a fragmentary vertical cross sectional view, to a larger scale, taken substantially along the line 2—2 of FIG. 1;

FIG. 3 is a horizontal sectional view taken substantially along the line 3—3 of FIG. 2;

FIG. 4 is a fragmentary perspective view of the sidewall overlying cover supporting rail;

DESCRIPTION OF THE PREFERRED EMBODIMENTS

Figure 5:
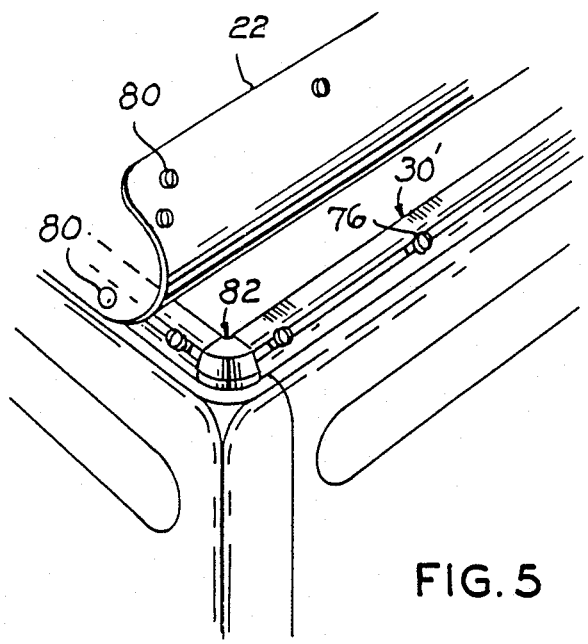
FIG. 5 is a fragmentary perspective view illustrating a cover support rail overlying the pickup bed, end gate and connected with the rearward end portion of the respective cover supporting side rail.

Like characters of reference designate like parts in those figures of the drawings in which they occur.

Figure 7:
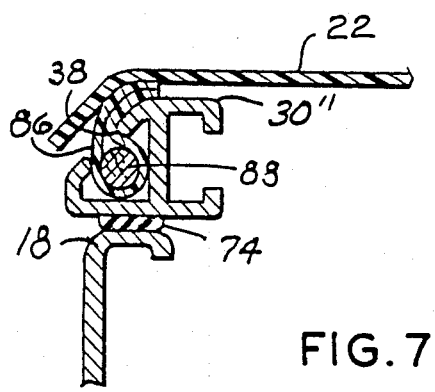
FIG. 7 is a fragmentary vertical cross sectional view taken substantially along the line 7—7 of FIG. 1; and, FIG. 8 is a fragmentary perspective view of one end of a cover supporting transverse rod.

In the drawings:

The reference numeral 10 indicates the pickup bed of a pickup truck having sidewalls 12 and 14 spanned at their rearward ends by an end gate or tailgate 16 extending between the sidewalls 12 and 14. The forward limit of the pickup bed and its sidewalls is defined by a forward wall 18 (FIG. 7) adjacent the rearward limit of the pickup cab 20. A cover 22, usually formed from plastic material, overlies at its perimeter edge portions and is secured to the pickup bed sidewalls, end gate and forward wall in the manner to be presently explained.

Referring more particularly to FIG. 2, the sidewall 12 is substantially typical of pickup truck bed sidewalls presently in use, usually formed from sheet material with an upright or vertical portion 24 substantially normal to the front of the pickup bed, not shown, and is turned inwardly in a generally horizontal plane, as at 26, and terminates at its inward limit in a downturned sidewall flange portion 28 angularly inclined downwardly laterally inward of the vertical portion 24 of the sidewall.

An elongated metallic extrusion forms a rail 30 generally triangular shaped in end elevation longitudinally overlies the pickup sidewall generally horizontal top surface 26 adjacent its inward limit. The rail 30 is characterized by a horizontal top wall 32 parallel with a base wall 34 and interconnected by a web 35 intermediate their widths. A lateral edge portion of the top being angularly turned downwardly at substantially 45° to confront in spaced relation a similar upwardly turned extension 36 of the base to define an outwardly facing coextensive rail slot 38 for slidably receiving snap fasteners 40 as presently explained.

The other or laterally inward limit of the rail top wall 32 and its base 34 are respectively turned downwardly and upwardly laterally of the web 35 to define a rectangular bolt nut receiving slot 42 and a coextensive laterally inward facing slot 44 for admitting the shank of a bolt 46 for the purpose presently explained.

Clamp means 48 resiliently grips the sidewall flange 28 and supports the rail 30 on the upper surface of the sidewall. The clamp means 48 comprises a U-shaped channel 50 having a length substantially greater than the vertical height of the sidewall flange 28. The bight 52 of the channel 50 is apertured at its upper end for receiving the bolt 46 with its nut 54 disposed in the rail slot 42. A companion bar clamp member 56, substantially Z-shaped in side elevation and equidistant with that portion of the channel 50 depending from the sidewall 12, is rigidly connected by one leg of the Z-shape to the depending end portion of the channel by a pair of bolts and nuts 58. The other end or leg portion 60 of the bar clamp 56 terminates adjacent the bottom surface of the sidewall top portion 26 and in parallel spaced relation with the upper end portion of the channel 50 for forming a slot or throat 62 transversely loosely receiving an intermediate portion of the sidewall flange 28.

Adjacent its upper end, the bar clamp end portion 60 is provided with a horizontal flange 64 projecting toward the interior surface of the sidewall flange 28. A section of resilient material forming a bumper 66 is interposed between the flange 64 and sidewall flange 28. A thin strip of synthetic material, such as plastic 68, is bonded to the surface of the channel bight portion 52 in contact with the sidewall flange 28 to prevent damaging the finish of the latter.

A horizontal bottom flange or arm 70 extends from the depending end of the bar clamp 56 toward the inner wall surface of the sidewall 12 and supports a resilient bumper 72 similar to the bumper 66. Similarly, a length of resilient padding 74 is interposed between the rail 30 and the sidewall surface 26. The clamp means 48 and the rails 30 are thus resiliently supported on the respective pickup sidewall.

The two part snap fastener has its base 76 pop riveted to a snap fastener glide 78 longitudinally slidable in the rail slot 38. The cooperating snap top or button 80 of the respective snap fastener is secured in a conventional manner to the peripheral edge portion of the cover 22 in selected spaced relation so that when the fasteners are joined the cover is supported on the pickup bed. The spacing between the rails and the mounting of the companion portions of the snap rails on the cover being predetermined so that the cover may be manually pulled taut across the pickup bed and, when attached to the rails, biases or fulcrums the clamp means 48 about its channel bight contact with the pickup sidewall flange 28 and forcing the bumpers 66 and 72 into contact with the inner surfaces of the sidewall in cooperation with the bight portion of the channel 50.

Usually three or four of the clamp means 48, along the respective sidewalls 12 and 14 of the pickup bed, are sufficient to maintain the rails 30 thereon.

Figure 6:
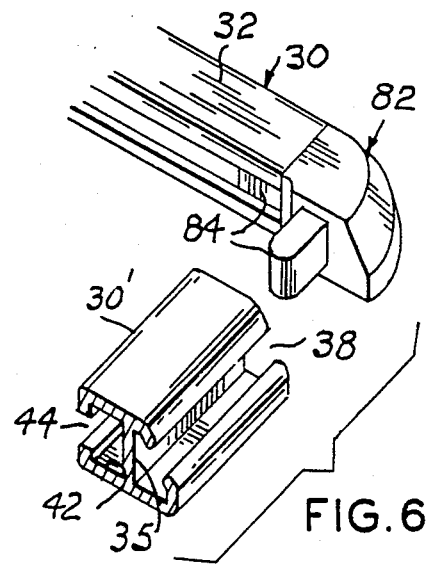
FIG. 6 is a fragmentary exploded perspective view, to a different scale, illustrating the manner of joining the adjacent ends of a pickup bed sidewall rail to one of the transverse end rails for the pickup bed.

A selected length of one of the rails 30, as indicated at 30', extends between the rearward end portions of the sidewall rails 30 in overlying relation with respect to the pickup end gate 16. The respective end portions of the rail 30 is supported by rail corner junctions 82 (FIGS. 5 and 6), each having a pair of rectangular in transverse section horizontal lugs 84 disposed in right angular relation and cooperatively received by the nut slot 42 in the end of the respective sidewall rail 30 and end gate rail 30'. The friction fit of the lugs 84 in the slots 42, in combination with the tension of the cover 22, maintains the end gate rail 30' in position and permits opening the end gate 16 while the cover remains in place. The rail 30' is preferably conventionally braced, not shown, to provide rigidity against bowing inward.

The forward end of the pickup bed is similarly provided with a transverse forward end rail 30" similarly connected to the sidewall rails 30 by other rail corner members 82. Since the forward rails are adjacent the rearward limit of the pickup cab 20, the forward end portion of the cover is connected to the rail 30" in the following manner. A loop 86, formed by doubling fabric material back upon itself and coextensive with the transverse width of the cover 22, is secured as by stitching it to the forward end portion of the cover 22. This loop 86 is then disposed in the snap slot 38 and an elongated dowel 88 (FIG. 7) is longitudinally inserted into the loop 86 while contained within the rail slot 38.

Obviously, the dowel may be inserted into the loop prior to inserting it into the rail slot and then the dowel and loop, as a unit, are longitudinally inserted in a sliding action into the rail.

Additionally, the central portion in smaller pickup beds and dual transverse positions of the cover is supported in standard pickup beds by an elongated rod 90 (FIGS. 2 and 8) extending between oppositely disposed rail supporting clamp members 48 by the respective end portion of the rod having a portion of its periphery removed, as at 92 (FIG. 8), and supported by the rail mounting bolt head 46. The respective end portion of the tube 90 is further transversely line drilled through the respective legs of the channel 50 for receiving a pin or bolt 94 to maintain the cover support rod 90 in place.

Obviously the invention is susceptible to changes or alterations without defeating its practicability. Therefore, I do not wish to be confined to the preferred embodiment shown in the drawings and described herein.

I claim:

1. A cover attachment apparatus for a vehicle bed having a sidewall which has a generally horizontal top portion and an inner downward depending flange, comprising:

an elongated rail means, adapted to overlie said sidewall top portion, for supporting a cover over said vehicle bed; and clamp means for clamping said rail means to said sidewall, said clamp means including:

an upper portion adapted for attachment to said rail means;

an upwardly open throat means for receiving said flange of said sidewall; and a lower portion having a lateral arm means extending outwardly for engaging an inward facing surface of said sidewall.

2. The apparatus of claim 1, wherein said clamp means further comprises:

an offset leg extending upwardly from said lower portion and laterally offset from said upper portion so that said upwardly open throat means is defined between said upper portion and said offset leg, said offset leg having an upper end means for engaging a bottom surface of said generally horizontal top portion of said sidewall.

3. The apparatus of claim 2, wherein:

said lower portion of said clamp means is detachably attached to said upper portion of said clamp means.

4. The apparatus of claim 2, wherein said clamp means further comprises:

a horizontal flange means projecting inward from said offset leg for engagement with an outward facing surface of said downward depending flange of said sidewall.

5. The apparatus of claim 4, wherein:

said lateral arm means of said lower portion of said clamp means includes a first resilient bumper so that said lateral arm means may resiliently engage said inward facing surface of said sidewall; and said horizontal flange means of said offset leg includes a second resilient bumper so that said horizontal flange means may resiliently engage said outward facing surface of said downward depending flange of said sidewall.

6. The apparatus of claim 5, further comprising:

a strip of resilient padding interposed between said elongated rail means and said sidewall top portion.

7. The apparatus of claim 4, wherein:

said horizontal flange means of said offset leg includes a resilient bumper so that said horizontal flange means may resiliently engage said outward facing surface of said downward depending flange of said sidewall.

8. The apparatus of claim 1, wherein:

said lateral arm means of said lower portion of said clamp means includes a resilient bumper so that said lateral arm means may resiliently engage said inward facing surface of said sidewall.

9. A cover attachment apparatus for a vehicle bed having a sidewall which has a generally horizontal top portion and an inner downward depending flange, comprising:

an elongated rail means, adapted to overlie said sidewall top portion, for supporting a cover over said vehicle bed; and fulcrum clamp means for clamping said rail means to said sidewall, said clamp means including:

an upper end portion adapted for attachment to said rail means;

an offset upwardly extending leg laterally offset from said upper end portion to define an upwardly open throat means for receiving said flange of said sidewall, said offset leg having an upper end means for engaging a bottom surface of said top portion of said sidewall; and a horizontal flange means projecting inward from said offset leg for engagement with an outward facing surface of said flange of said sidewall; and wherein said rail means and said clamp means are so arranged and constructed that when said rail means is placed on top of said top portion of said sidewall and said flange of said sidewall is received in said upwardly open throat means of said clamp means and said upper portion of said clamp means is rigidly fastened to said rail means, said flange of said sidewall is held between said upper end portion of said clamp means and said horizontal flange means of said offset leg and said top portion of said sidewall is clamped between said rail means and said upper end of said offset leg.

10. The apparatus of claim 9, wherein:

said horizontal flange means of said clamp means includes a resilient bumper so that said flange of said sidewall is resiliently held between said upper end portion of said clamp means and said horizontal flange means of said offset leg.

11. The apparatus of claim 10, further comprising:

a strip of resilient padding interposed between said elongated rail means and said top portion of said sidewall so that said top portion of said sidewall is resiliently clamped between said rail means and said upper end of said offset leg.

12. The apparatus of claim 9, further comprising:

a strip of resilient padding interposed between said elongated rail means and said top portion of said sidewall so that said top portion of said sidewall is resiliently clamped between said rail means and said upper end of said offset leg.

13. The apparatus of claim 9, wherein said clamp means further comprises:

a lower portion having said upper end portion and said offset leg extending upwardly therefrom; and a lateral arm means extending outwardly from said lower portion for engaging an inward facing surface of said sidewall.

14. The apparatus of claim 13, wherein:

said lateral arm means includes a resilient bumper for resiliently engaging said inward facing surface of said sidewall.

15. A cover attachment apparatus for a vehicle bed having a sidewall with a generally horizontal top surface comprising:

a flexible cover;

an elongated rail means, adapted to overlie said sidewall top surface, for supporting said cover over said vehicle bed, said rail means having an outer laterally open slot defined therein;

connector means, operably associated with said rail means, for connecting said rail means to said sidewall; and a plurality of two-part fastener means for fastening said cover to said rail means, each of said fastener means including:

a first part fixed to said cover; and a second part slidably received in said open slot of said rail means.

16. The apparatus of claim 15, wherein said rail means further comprises:

a base having an outer generally upward turned edge;

a top wall having an outer generally downward turned edge;

a web connecting said base and said top wall; and wherein said outer laterally open slot of said rail means is defined between said upward turned edge of said base and said downward turned edge of said top wall.

17. The apparatus of claim 16, wherein:

said upward and downward turned edges of said base and said top wall, respectively, lie in a plane oriented at an acute angle to said web so that said second part of each of said fastener means extends upwardly and outwardly from said rail means.

18. The apparatus of claim 16, wherein:
said rail means further includes an inner laterally open slot defined therein between an inner substantially vertical upward turned edge of said base and an inner substantially vertical downward turned edge of said top wall.

19. The apparatus of claim 18, wherein said connector means comprises:
a plurality of nut and bolt assemblies each having an end thereof slidably received between said web and said inner vertical upward and downward turned edges of said base and said top wall; and
a plurality of fulcrum clamp means for clamping said rail means to said sidewall, each of said clamp means having an upper end portion bolted to said rail means by one of said nut and bolt assemblies.

20. The apparatus of claim 18, wherein:
said rail means is a metallic extrusion.

21. The apparatus of claim 18, being further characterized as a cover attachment apparatus for a generally rectangular vehicle bed having first and second opposed sidewalls, a front end wall, and a tailgate, wherein said rail means further comprises:
first and second opposed side rails overlying said first and second opposed sidewalls, respectively, and connected thereto by said connector means;
a front rail extending between front ends of said first and second side rails and overlying said front end wall;
a rear rail extending between rear ends of said first and second side rails and overlying said tailgate; and
slip joint corner connectors connecting said side rails with said front and rear rails, said corner connectors including substantially rectangular cross-section lugs closely received within the ends of said rails inward of said webs.

22. The apparatus of claim 15, being further characterized as a cover attachment apparatus for a generally rectangular vehicle bed having first and second opposed sidewalls, a front end wall, and a tailgate, wherein:
said rail means includes first and second opposed side rails, a front rail and a rear rail corresponding to said first and second opposed sidewalls, said front end wall and said tailgate, respectively; and
wherein said rear rail is supported between said first and second side rails so that said tailgate may be opened and closed while said cover remains in place covering said bed.

23. The apparatus of claim 15, being further characterized as a cover attachment apparatus for a generally rectangular vehicle bed having first and second opposed sidewalls and a front end wall, wherein:
said rail means includes first and second side rails and a front overlying said first and second sidewalls and said front wall, respectively;
said flexible cover is a generally rectangular cover having a front edge, and having a loop formed adjacent said front edge, said loop being received through said outer open slot of said front rail; and
an elongated rod-like member having a diameter greater than a width of said outer open slot of said front rail, said rod-like member being disposed within a portion of said loop received through said outer open slot of said front rail to hold said front edge of said cover in place.

24. A cover attachment apparatus for a vehicle bed having a sidewall with a generally horizontal top surface, comprising:
an elongated rail means, adapted to overlie said sidewall top surface, for supporting a cover over said vehicle bed, said rail means having a cross-sectional shape including:
a generally horizontal base having an inner vertically upward turned edge;
a top wall having an inner vertically downward turned edge, thus defining an inner laterally open slot between said inner edges of said base and said top wall;
a vertical web connecting said base and said top wall outward of said inner edges, thus defining a substantially rectangular cross section longitudinal passage between said web, said inner edges, said top wall and said base, said passage having a vertical height between said top wall and said base greater than a vertical height of said inner laterally open slot; and
a plurality of connector means for connecting said rail
means to said sidewall, each of said connector means having an upper end portion attached to said rail means by a nut and bolt assembly, one of said nut and a head of said bolt being slidably non-rotatably received in said substantially rectangular cross section longitudinal passage with said bolt extending through said inner laterally open slot.

25. The apparatus of claim 24, being further characterized as a cover attachment apparatus for a generally rectangular vehicle bed having first and second opposed sidewalls, a front end wall, and a tailgate, wherein said rail means further comprises:
first and second opposed side rails overlying said first and second opposed sidewalls, respectively, and connected thereto by said connector means;
a front rail extending between front ends of said first and second side rails and overlying said front end wall;
a rear rail extending between rear ends of said first and second side rails and overlying said tailgate; and
slip joint corner connectors connecting said side rails with said front and rear rails, said corner connectors including substantially rectangular cross-section lugs closely received within said substantially rectangular cross section longitudinal passages of said rails.

* * * * *